United States Patent [19]

Adams

[11] 3,966,445
[45] June 29, 1976

[54] FREEZE REFINING METHOD

[76] Inventor: Clyde C. Adams, P.O. Box 31, French Settlement, La. 70733

[22] Filed: June 7, 1974

[21] Appl. No.: 477,366

[52] U.S. Cl.................................... 62/58; 62/71; 62/73; 62/345; 23/273 F; 23/273 C; 23/295 R; 23/296
[51] Int. Cl.²..................... B01D 9/00; B01D 9/04
[58] Field of Search.............. 62/58, 123, 124, 345, 62/71, 73; 23/273 F, 273 SP, 301 SP, 296, 295

[56] References Cited
UNITED STATES PATENTS

| | | | |
|---|---|---|---|
| 911,238 | 2/1909 | Havenstrite............................. | 62/73 |
| 2,764,880 | 10/1956 | Wenzelberger......................... | 62/58 |
| 2,780,663 | 2/1957 | Gunness............................ | 23/273 F |
| 2,945,903 | 7/1960 | Findley.............................. | 23/273 F |
| 3,092,673 | 6/1963 | Rush.................................. | 23/273 F |
| 3,261,170 | 7/1966 | McCarthy......................... | 23/273 F |
| 3,400,548 | 9/1968 | Drayer.................................. | 62/58 |
| 3,543,531 | 12/1970 | Adams............................. | 23/273 SP |

*Primary Examiner*—Stephen J. Emery
*Attorney, Agent, or Firm*—Pravel & Wilson

[57] ABSTRACT

An improved freeze refining method including the steps of collecting a heterogeneons material in crystalline form from a heated melt containing pure and impure materials and removing the collected crystals while maintaining the integrity of the crystals.

7 Claims, 5 Drawing Figures

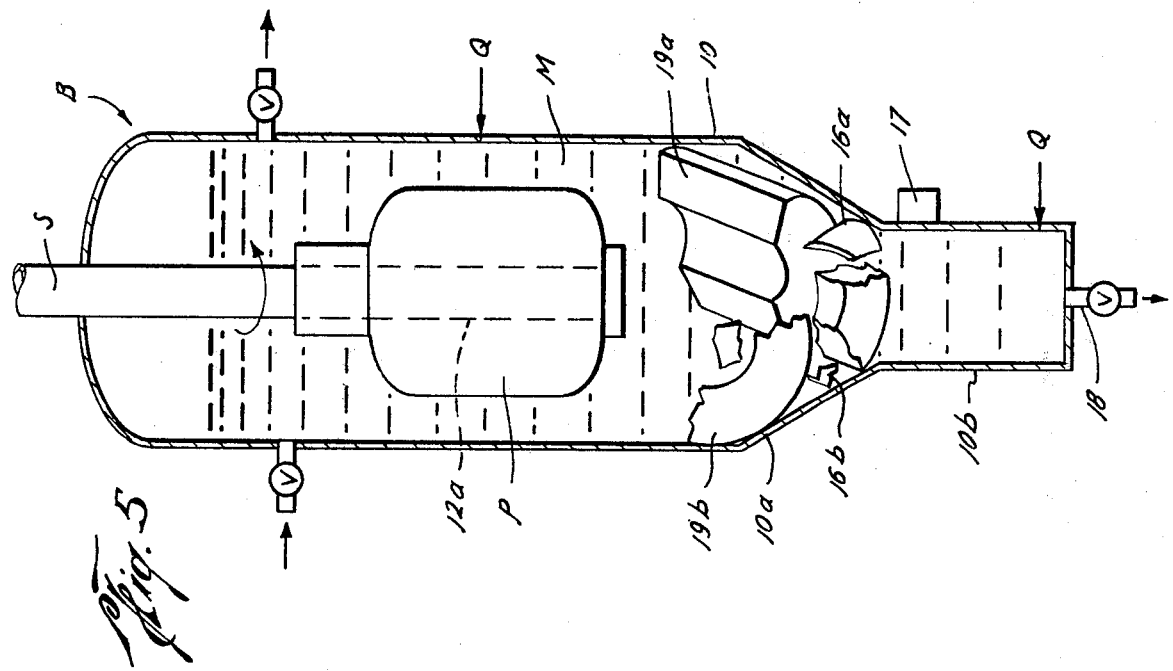
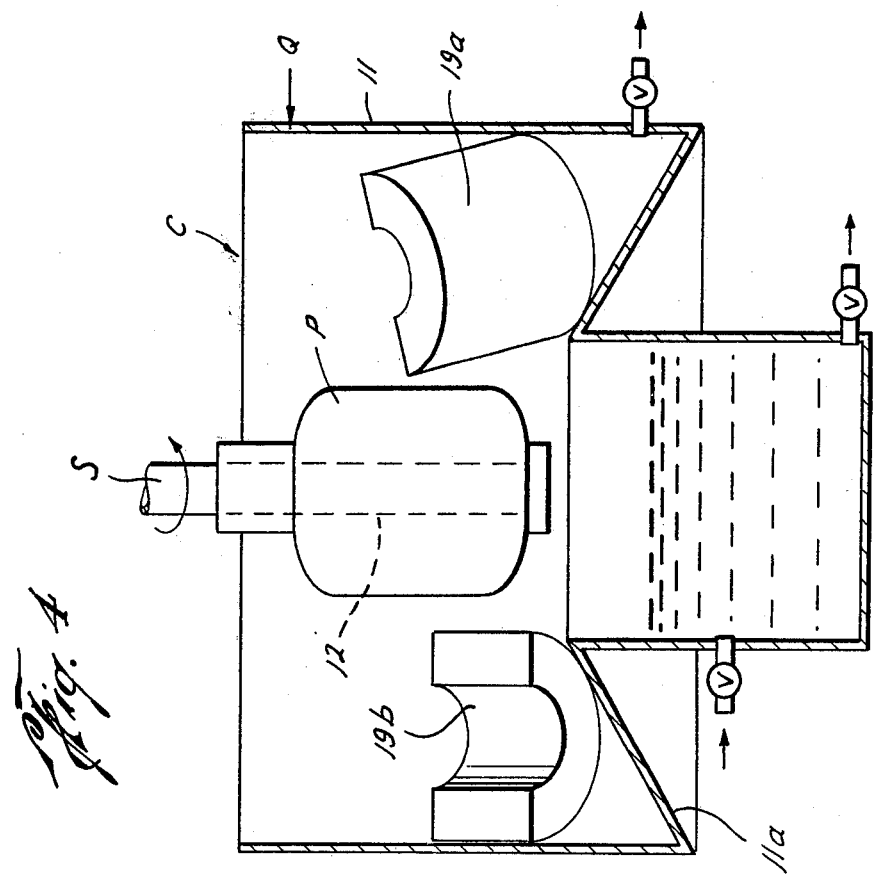

FREEZE REFINING METHOD

BACKGROUND OF THE INVENTION

The field of this invention is freeze refining methods.

U.S. Pat. No. 3,543,531 issued to this inventor discloses a basic freeze refining apparatus for collecting pure materials from a melt by use of a cooling shaft rotated in the melt. The material collected was removed by mechanical means such as a blade on by migration up a tapered thread.

SUMMARY OF THE INVENTION

It is an object of this invention to provide a new and improved method for separating a pure material from a melt containing pure and impure materials. It is further an object of this invention to provide a new and improved method for concentrating a higher percentage of such pure materials on a rotating shaft and thereafter removing such collected pure materials from the shaft while maintaining the integrity of the crystalline solid collected on the rotating shaft.

In the preferred embodiment of this invention, the method of freeze refining includes the steps of providing a vessel containing a liquid melt, which melt includes both pure and impure materials, the pure materials being capable of solidifying in crystalline form; and rotating a cooling shaft in the liquid melt within a particular range of rotational speed which provides for a maximum deposit rate of pure material from said melt onto the rotating shaft.

The pure material along with some trace of impurities is deposited from the melt onto the shaft in substantially a crystalline form. The deposit of the pure material along with some impurities onto the rotating shaft is accomplished by providing for a grain growth of the deposited solid in a radial direction which forms discrete heterogeneous crystals of substantially pure material having grain boundaries of substantially impure material.

The collected heterogeneous, crystalline material is removed from the shaft without damaging the crystalline formation of the collected solid, thus maintaining the integrity of the crystal formation. This is accomplished by rotating the shaft having the material deposit thereon at sufficient speed to exert sufficient centrifugal force to cause the collected material to separate along the grain boundaries of at least some of the crystals collected.

Prior to such rotation to cause separation by centrifugal force, the collected solid on the shaft is heated sufficiently to cause impurities at the grain boundaries to weaken sufficiently to encourage separation of the collected material along grain boundaries.

It is further an object of this invention to vary the size of the crystals collected on the rotating shaft by varying the purity of the melt.

It is additionally an object of this invention to vary the purity of the crystals collected by controlling the rate of growth of the crystals such as by increasing the growth rate by increasing the rotational speed of the shaft and by increasing the effective temperature differential between the melt and the shaft.

It is further an object of this invention to operate the rotating shaft within a rotational speed range which provides for substantially an optimum collection rate of the pure material from the melt onto the rotating shaft.

It is further an object of this invention to further purify the solid deposit of crystals after separation of the crystals from the shaft by washing the crystals with the melt. The discrete crystals are purified after separation from the rotating shaft by melting off impurities from the exposed grain boundaries of the separated discrete crystals prior to removal of such crystals from the process after separation of the crystals from the shaft.

BRIEF DESCRIPTION OF THE DRAWING

FIG. 4 is a partly schematic view illustrating the separating of the deposited solid from the rotating shaft; and FIG. 5 is a partly schematic view illustrating the separation of the material deposited on the rotating shaft from the shaft in a very small number of pieces or chunks and the washing thereof.

DESCRIPTION OF THE PREFERRED EMBODIMENT

Figure 1:
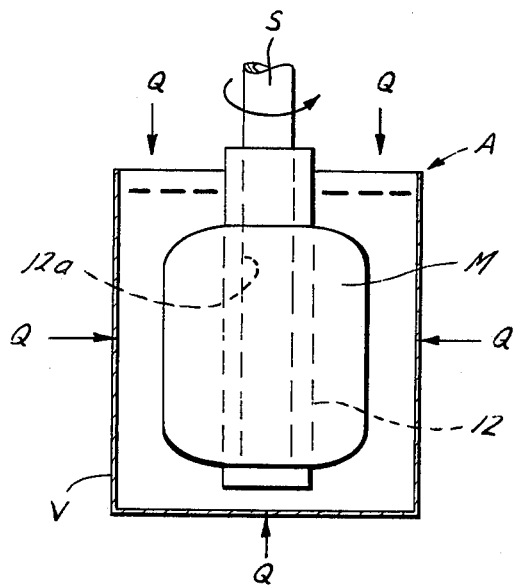
FIG. 1 is a schematic view of a basic freeze refining apparatus.

Referring to the drawings and in particular FIG. 1, the letter A generally designates a freeze refining apparatus for refining a pure material P from a melt M in a vessel V, which melt contains both a pure material and an impure material. The basic apparatus A was previously disclosed in U.S. Pat. No. 3,543,531 issued to this same inventor. This application is directed to refinements and improvements in the method of separating the pure material P from the melt M, rotating shaft S on which the material P has been deposited, and in actuality further purifying the pure material P after removal. The letters B (FIG. 5) and C (FIG. 4) generally designate other forms of the freeze refining apparatus A of FIG. 1 which are used in conjunction with the various methods of removal of the pure material P to be described herein. For the purposes of convenience, like numbers and letters will be used to describe the same identities in the various figures.

The melt M is a molten material which is heated within the vessel V by any suitable heating means such as direct heating or induction heating. For the purposes of illustration, the letter Q in conjunction with an appropriate arrow has been utilized in a conventional manner in FIGS. 1, 4 and 5 to indicate the application of heat by any suitable means to the vessel V of FIG. 1 and to the vessel 10 for the apparatus B in FIG. 5 and to the vessel 11 for the apparatus C in FIG. 4.

The melt M from which the pure material P is collected contains both pure material and impure materials. It is the object of this invention to recover either a pure material P or an impure material, whichever is desired, by utilization of the method described herein. Examples of particular materials to be recovered by the application of the method of this invention will be described hereinafter.

Figure 2:
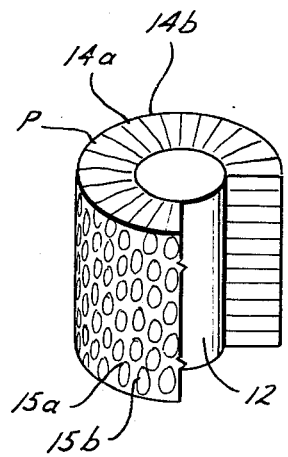
FIG. 2 is a schematic view illustrating the crystalline structure of the material collected on the cooling shaft.

Referring to FIG. 1, the method of collection or deposit of the pure material P, similar to that set forth in the prior mentioned patent, may be described as follows. The vessel V is heated by such suitable means to the proper temperature to maintain the material of the melt M in a liquid state. The rotating shaft S, which may be rotated by any suitable means, is inserted into the melt and is rotated at particular, design speeds to be discussed later. The rotating shaft S is a cooling shaft which is cooled by the circulation of a proper coolant through portion 12 of the shaft S which is actually inserted into the liquid melt M. The rotation of the shaft S in combination with the effective temperature differential between the cooling shaft portion 12 and the melt M result in the deposit of the pure material P in a cylindrical shape such as illustrated in FIG. 2 onto the cooling shaft portion 12.

Since the prior patent, it has been discovered that the pure material P deposits onto the cooling shaft portion 12 in a crystalline form. The pure material P is deposited by a radial grain growth which is illustrated by the radially directed grain boundaries such as 14a and 14b illustrated in FIG. 2. During the depositing process, the pure material P is deposited onto the rotating shaft portion 12 in a radial direction and the grain boundaries such as 14a and 14b are also formed in a radial direction. This results in a plurality of discrete, radially oriented grains such as 15a and 15b which are formed with radially directed grain boundaries. Such grains as 15a are indeed discrete and distinguishable and include substantially pure material within the grain with the impure materials forming the grain boundaries which bond the crystals such as 15a and 15b together on the rotating shaft portion 12.

The size and purity of the crystals 15a may be varied as follows. The size of the crystals collected on the rotating cooling shaft portion 12 may be varied by varying the purity of the melt. It has been discovered that the greater the purity of the melt, the greater the size of the crystals 15a deposited onto the rotating shaft portion 12. As a corollary, the greater the percentage of impurities in the melt M, the smaller the relative size of the crystals 15a deposited onto the rotating shaft portion 12.

It has further been discovered that the purity of the crystals may be varied by varying the rate of growth of the crystals. It has been discovered that it is possible to decrease the purity of the pure material P collected on the rotating shaft portion 12 by increasing the growth rate of the crystals. As the growth rate of the crystals is increased, there is a greater likelihood of impure materials, which is located within a diffusion film between the rotating shaft portion 12 and the pure material thereon and the melt to be entrapped within the interstices of the crystalline molecules structure forming crystals such as 15a.

The growth rate or deposit rate of pure material P on shaft portion 12 is increased by increasing the effective temperature differential between the temperature of the melt M and the temperature of the rotating cooling shaft portion 12. This may be accomplished by increasing the volume of coolant being circulated within hollow portion 12a of the rotating shaft S or by decreasing the temperature of the coolant in the hollow shaft portion 12a.

Figure 3:
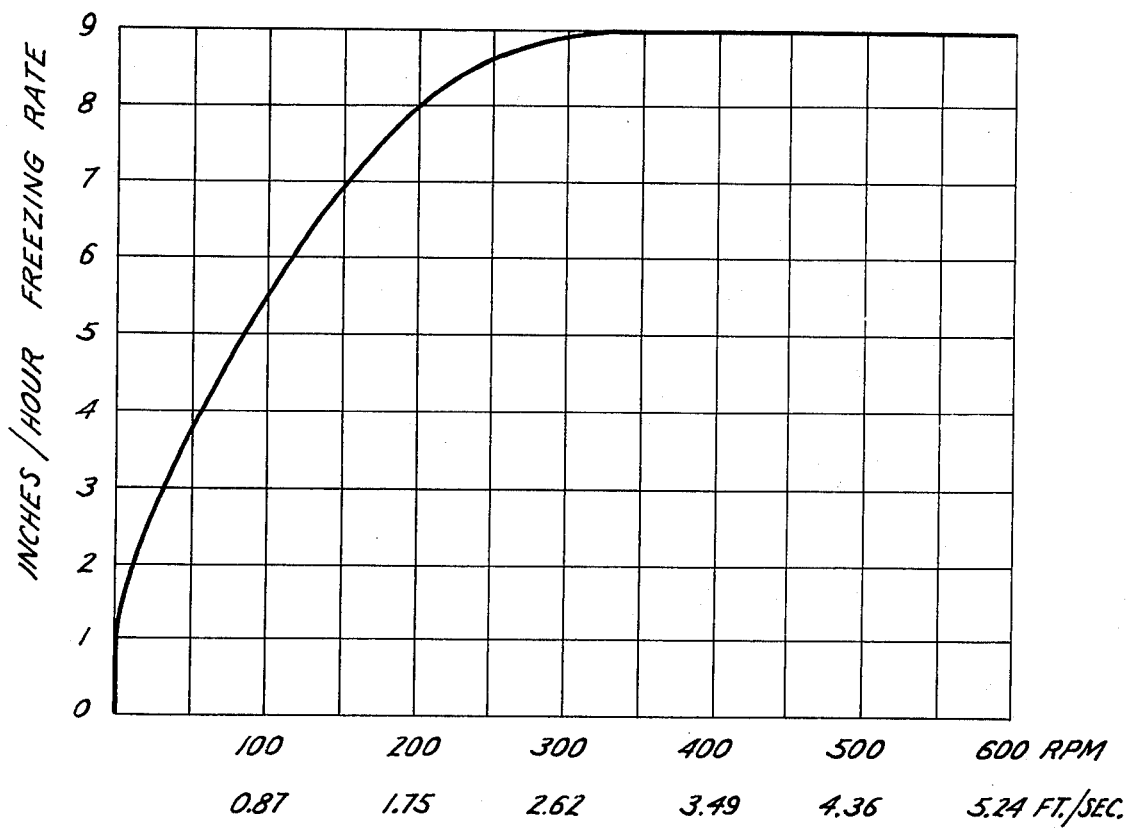
FIG. 3 is a graph which illustrates the deposit rates as related to shaft rpm and peripheral speed for various materials being collected on a rotating cooling shaft.

Referring to FIG. 3, it has been further discovered that the pure material P being deposited on the rotating shaft portion 12 is deposited at an optimum rate; depending upon a particular rpm range which is determined for each material forming the melt M, there is a maximum deposit rate of pure material P on the rotating shaft portion 12. Below such optimum rpm rate, the growth rate of the pure material M onto the rotating shaft portion 12 is reduced; and, for rpm rates above such optimum range, the growth rate of pure material P onto the rotating shaft portion 12 is also reduced, or at least not substantially increased. FIG. 3, is an example of this phenomenon. In FIG. 3, a graph of shaft speed and peripheral collected material speed (abscissa) is charted against freezing rate (ordinate) for the recovery of purified tin from a tin melt. The impurity shown being collected is tin. It is noted that the freezing rate levels do not materially increase after a certain speed range level is attained. Thus it is desirable to operate at the speed range providing maximum freeze rate results. The most important speed is the speed of the rotating collected material, since this determines the amount of area per unit time in contact with a melt area. Also, the rpm will vary with melt size. Thus to maintain a desired speed level such as 3.49 ft/sec. of the collected material, it will be necessary to reduce rpm as the radial size of the collected deposit of shaft portion 12a grows. It is thus a part of this invention to operate the freezing shaft portion 12a in a speed range providing substantially the maximum freeze rate, unless it is desired to vary the purity of the collected solid.

FIGS. 5 and 4 respectively disclose apparatus B and C which illustrate the methods of the preferred embodiment of this invention for removing the deposited pure material P from the cooling shaft S. The deposited pure material P which has been collected as a result of substantially radial grain growth with respect to the shaft S, is removed by separating the cylindrical ring of material P along grain boundaries such as 14a and 14b thereby separating the pure material P from the cooling shaft portion 12 while maintaining the integrity of the crystalline formation. The pure material P is removed according to the method of this invention without destroying the crystalline formation of the pure material P. This is accomplished by the application of centrifugal force which results from rotating the shaft S at a substantially high rpm, higher than the rpm utilized during the collection process. Referring to FIG. 5, the rotating shaft S may be removed from the melt M located in the vessel V and inserted into the vessel 10 for the apparatus B. Sufficient heat is then applied to weaken the pure material P at the grain boundaries such as 14 a, which contains substantiallly more impurities than the interior of the crystals such as 15a and thus has a lower melting point than the interior of the crystals. After sufficient heat has been applied to weaken the pure material P at the grain boundaries, the rotating shaft S is rotated by any conventional means with sufficient speed to cause the pure material P to shear along grain boundaries such as 14a and sling off of the rotating shaft portion 12. Utilizing this separation process within the vessel or chamber 10, the ring of pure material P is separated into chunks such as 16a and 16b which may fall to converging lower portion 10a of the vessel 10. These chunks may be individual or multi-crystal pieces which have been separated from the shaft portion 12 along the weakened grain boundaries between the crystals.

The separated chunks, or single or multi-crystals, such as 16a and 16b, are then mechanically compacted such as by the use of a vibration means 17 mounted onto the bottom section 10b of the vessel 10. Such vibrator means 17 may be of any suitable construction suitable for compacting the material. Heat may then be applied to this bottom vessel section 10b to remelt the single or multi-crystal chunks such as 16a and 16b, which then may be removed through exit line 18.

The apparatus B need not be a separate apparatus from the initial deposit apparatus such as A in FIG. 1. Rather, the apparatus B illustrated in FIG. 5 may also be the initial collection or deposit apparatus used to deposit the pure material P onto the rotating shaft portion 12a. In this instance, the vessel 10 is filled with the melt M just as the vessel V in FIG. 1. In this case, the pure material P is first deposited as heretofore described with respect to the apparatus A onto the rotating shaft 12a. The temperature of the melt M is then raised, if necessary, to weaken the interstitial bonds within the grain boundaries such as 14a between the collected crystals such as 15a and 15b. After the grain boundaries between the crystals are sufficiently weakened, the rotating shaft S is rotated to sufficient speed to create sufficient centrifugal force to a break off of the pure material P in single or multi-crystal chunks such as 16a and 16b. These pieces such as 16a and 16b actually break and separate off of the remaining, collected pure material P along the weakened grain boundaries such that the crystals themselves remain intact and are not destroyed. In this manner, the integrity of the crystals and thus the integrity of the substantially pure material in the interior of the crystals is maintained.

It has also been discovered that the rotating shaft S can be rotated with sufficient speed to cause the ring of pure material P to expand sufficiently to drop or fall away from the shaft S in substantialy one or two pieces such as 19a and 19b. This is also illustrated in FIG. 4 where a slightly different vessel arrangement 11 is illustrated for the apparatus C. In the apparatus C of FIG. 4, the vessel 11 includes a circumferential rim portion 11a which is designed to receive the chunks such as 19a and 19b after they have been slung away from the rotating shaft S.

Referring again to FIG. 5, the released pieces such as 19a and 19b and chunks such as 16a and 16b are then "washed" as follows. First of all, it must be stated that the washing step can refer to the situation where the ring of pure material P has been collected on the shaft S and then the shaft is moved to a second container such as discussed with respect to the apparatus B in FIG. 5. In the second container, a melt M, which may be a slightly different composition than the melt using the collection apparatus of FIG. 1 and designated by the same letter for convenience, is maintained by the application of heat. Or, the vessel 10 of FIG. 5 may be used to practice the original collection or deposit method set forth herein to deposit the ring of material P onto the rotating shaft S, such deposit being formed by a substantially radial grain growth formed by grain boundaries which extend substantially radially from the shaft S as previously described. In either event, the vessel 10 of FIG. 5 is filled with melt M. The melt M is heated to such temperature to weaken the bonds of the grain boundaries as heretofore described, and then the shaft S is rotated sufficiently high to cause the halves such as 19a or the chunks such as 16a to break off into the melt M. If the density of the broken off materials such as 16a is greater than the density of the melt M itself, the chunks 16a will sink towards the converging lower section 10a of the vessel 10. Since the chunks 16a have been separated along the grain boundaries such 14a, the grain boundaries of the chunks are exposed. This is true whether the chunks are single crystals or multi-crystals. The grain boundaries, having been formed of impurities, will melt at a low melting temperature than the interior of the single or multi-crystals such as 16a. Sufficient heat is applied to the melt M to cause the melt M to melt away at least in part the impurities located in the exposed grain boundary surface of the chunks such as 16a. In this manner, as the chunks such as 16a sink downwardly through the melt M, the surface impurities are removed due to the melting temperature of the melt M. This leaves the single crystal multi-crystal chunks 16a even more pure than they were when they were actually separated from the rotating shaft portion 12. The chunks such as 16a, with the grain boundary impurities melted off, may then be removed from the melt M either in a solid form or may be melted and then removed such as through line 18.

The washing process may also include a further melting of the single crystal or multi-crystal chunks 16a in the converging or recovery section 10a thereby releasing some of the substantially pure material from the interior of the crystal back into the melt. This melting of the pure material in the already washed crystals in the recovery section 10a is accomplished by heating such recovery section to higher temperatures than the rest of the melt. This very pure material from the interior of the crystal is circulated upwardly toward the rotating shaft portion 12 thus moving countercurrently to sinking crystals 16a. In this manner, the actual pure material P in a remelted form is used at least in part to wash off the impurities in the grain boundaries of the sinking chunks such as 16a. And, some of this countercurrently flowing, remelted pure material actually collects onto the chunks 16a sinking into the recovery section 10a. Thus, the separated chunks such as 16a are effectively washed to remove more impurities and then melted to return some of the pure material to the melt M prior to the actual withdrawal of the crystal from the vessel 10. The amount of remelted pure material used for the countercurrent washing will vary with the amount of the melting of the interior portions of the chunks 16a in the recovery section 10a. Thus, if it is desired to provide more pure material to countercurrently wash the sinking chunks, the sunken chunks are heated to a higher temperature so that more pure material melts off of them. The impurity level in the liquid melt M is controlled by adding fresh feed continuously and withdrawing liquid from the apparatus continuously.

Of course, if the pure material P being collected is less dense than the melt M, then the chunks such as 16a which are separated away from the rotating shart 12, will rise toward the surface of the melt M and the recovery zone will be located at the top of the melt M in the vessel 10 rather than at the bottom. The washing principals, however will apply equally well whether the immediately separated chunks such as 16a are rising to the top of the melt M or sinking to the bottom of the melt M.

EXAMPLE

By way of example, and not limitation, the following method is described in its application to recover substantially pure aluminum. Utilizing a rotating shaft having a 2½ inch outside diameter, the rotating shaft is rotated in a range of 500 to 600 rpm in a vessel having an inner diameter of 11 inches and being about 23 inches long. The freezing rate or rate of collection of the substantially pure aluminum in crystalline form onto the rotating shaft is approximately 3 radial inches per hour. The freezing or collection process continues until the collected ring of materials P is within 1 inch to ½ inch of the inside wall of the vessel. Such process provides a substantially high purity aluminum in crystalline form after it has been removed by the removal process described herein. The actual crystals formed on the shaft are distinguishable and discrete.

EXAMPLE

Again, a 2½ inches shaft or mandrel is utilized at a rotational speed of 500 to 600 rpm to recover divinyl benzene from a melt containing divinyl benzene and various impurities. The collection process in this case again occurs at about a rate of 3 radial inches per hour.

The freezing or refining process and method set forth in this invention may be utilized to recover or separate various types of materials including metals, organics and inorganics. And, the process of this invention and the improvements noted herein, as compared with U.S. Pat. No. 3,543,531, produces new and unexpected results in terms of the efficient recovery of extremely highly pure material even as compared with the apparatus disclosed in that patent. The apparatus of this invention is used to separate lead, divinyl benzene, styrene, aluminum, orange juice, food coloring and even beer. Of course, it is understood as previously discussed that the desired product may be either the pure material P collected on the rotating shaft S or it may be the material remaining in the melt M after the collection process. This simply depends upon the nature of the melt M. and the desired result.

For example, it is desirable to concentrate orange juice by separating and collecting water in crystalline, ice form from a melt of orange juice. It should be understood that the pure material described in the interior of the crystals actually contained some impurities within, that it has been considered as "pure" for the purposes of simplifying the description herein.

The foregoing disclosure and description of the invention are illustrative and explanatory thereof, and various changes in the size, shape and materials as well as in the details of the illustrated construction may be made without departing from the spirit of the invention.

I claim:

1. A method of crystal collection, including the steps of:
   providing a vessel containing a liquid melt, said melt including pure and impure materials;
   said pure materials being capable of collection in crystalline form;
   maintaining said melt in substantially a liquid phase in said vessel;
   providing a rotatable cooling shaft in said melt;
   collecting heterogeneous material in discrete crystalline form on said shaft by substantially radial grain growth with respect to said shaft with said discrete cystals including substantially pure material within and having grain boundaries at least partly formed of said impure materials; and wherein the improvement comprises,
   using centrifugal force caused by rotation of said cooling shaft to remove said heterogeneous material from said shaft in solid chunk form without fully melting by separating said material along the grain boundaries thereof.

2. The method set forth in claim 1, including:
   rotating said cooling shaft in a speed range providing maximum collection rate of said heterogeneous material in substantially radially directed crystalline form on said shaft.

3. The method set forth in claim 1, including:
   breaking away said collected crystals from said shaft by centrifugal force with the shaft immersed in a melt.

4. The method set forth in claim 1, including:
   heating said collected crystals sufficiently to weaken the grain boundaries thereof; and
   rotating said cooling shaft with sufficient speed to throw off said crystals.

5. The method set forth in claim 1, including:
   removing said cooling shaft and collected heterogeneous material from contact with said melt;
   placing said collected heterogeneous material in a temperature controlled chamber and heating same to weaken the bonds at said grain boundaries; and
   rotating said cooling shaft with sufficient speed to cause said collected heterogeneous material to break off of said shaft along said grain boundaries.

6. The method set forth in claim 1, including the step of:
   heating said collected heterogeneous material and rotating said shaft with said material thereon at sufficient speed to create sufficient centrifugal force to cause said collected material to sufficiently expand to allow the collected material to be removed in substantially one piece.

7. The method set forth in claim 1, including the step of:
   heating said collected heterogeneous material and rotating said shaft with said material thereon to cause said collected material to sufficiently expand due to centrifugal force to allow the collected material to be removed in substantial multi-crystal chunks.

* * * * *